(12) United States Patent
McDonough et al.

(10) Patent No.: US 11,066,181 B2
(45) Date of Patent: Jul. 20, 2021

(54) SYSTEM AND METHOD OF DETERMINING AND DISPLAYING PROCEDURES FOR AN ENGINE-OUT TAKEOFF FOR AN AIRCRAFT

(71) Applicant: AeroData, Inc., Scottsdale, AZ (US)

(72) Inventors: Terry L. McDonough, Scottsdale, AZ (US); Garrett W. van Ark, Phoenix, AZ (US); Scott E. Graham, Fountain Hills, AZ (US)

(73) Assignee: AeroData, Inc., Scottsdale, AZ (US)

( * ) Notice: Subject to any disclaimer, the term of this patent is extended or adjusted under 35 U.S.C. 154(b) by 0 days.

(21) Appl. No.: 16/948,854

(22) Filed: Oct. 2, 2020

(65) Prior Publication Data

US 2021/0101695 A1  Apr. 8, 2021

Related U.S. Application Data

(60) Provisional application No. 62/910,084, filed on Oct. 3, 2019.

(51) Int. Cl.
*B64D 45/04* (2006.01)
*B64D 43/00* (2006.01)

(52) U.S. Cl.
CPC ................................ *B64D 43/00* (2013.01)

(58) Field of Classification Search
None
See application file for complete search history.

(56) References Cited

U.S. PATENT DOCUMENTS

| | | | |
|---|---|---|---|
| 5,945,926 A * | 8/1999 | Ammar | F41G 7/2246 340/970 |
| 2018/0075762 A1* | 3/2018 | Gadgil | B64D 43/02 |
| 2019/0019423 A1* | 1/2019 | Choi | G01S 13/933 |

OTHER PUBLICATIONS

Printout from https://ww2.jeppesen.com/flight-planning-and-dispatch/jeppesen-opsdata/ published prior to Oct. 2, 2020.
Printout from https://www.dynamicsource.se/service/ds-performance/ published prior to Oct. 2, 2020.
Printout from https://www.navblue.aero/product/flysmart-plus/ published prior to Oct. 2, 2020.
Printout from https://www.navblue.aero/product/flysmart-plus/#product-img-4 published prior to Oct. 2, 2020.
U.S. Appl. No. 16/948,853, filed Oct. 2, 2020.

* cited by examiner

*Primary Examiner* — Brent Swarthout
(74) *Attorney, Agent, or Firm* — Samuel M. Korte; Max M. Ali

(57) ABSTRACT

A system and method of displaying an Engine Failure Awareness Chart (EFAC) for aircraft with at least one engine out is shown and described herein. The EFAC may display lines and zones indicative of levels of risk of obstacles on the ground. The obstacles may be either man-made or natural structures. The EFAC may update continuously providing the pilot with a real-time awareness of the risks around the aircraft during an engine failure. Using the EFAC the pilot may navigate the aircraft to a landing area or back to the airport for landing.

20 Claims, 6 Drawing Sheets

SYSTEM AND METHOD OF DETERMINING AND DISPLAYING PROCEDURES FOR AN ENGINE-OUT TAKEOFF FOR AN AIRCRAFT

RELATED APPLICATION

The present application claims the benefit under 35 U.S.C. 119(e) of U.S. Provisional Application Ser. No. 62/910,084, filed Oct. 3, 2019, and entitled "AIRCRAFT PERFORMANCE MONITOR," which is herein incorporated by reference in its entirety.

BACKGROUND

In typical aircraft takeoff and landing procedures, the height above ground of obstacles surrounding an airport may be known. A pilot of an aircraft may be in communication with airport personnel such as air traffic controllers. In the event of a malfunctioning engine during takeoff the pilot may abort the takeoff and stop on the runway. However, if the aircraft has reached a minimum takeoff speed or if the aircraft is in the air, the pilot may have no other option than to fly the aircraft with the malfunctioning engine or with the engine out.

SUMMARY

Embodiments of the invention provide systems and methods that determine and display an Engine Failure Awareness Chart that displays high risk areas for a pilot when the aircraft is disabled by an engine failure. A first embodiment is directed to a system for determining a minimum distance from ground-based obstacles for an aircraft and displaying an engine failure awareness chart comprising, a user interface configured to display the engine failure awareness chart, at least one processor configured to obtain an aircraft characteristic and a location of the ground-based obstacles. and determine a distance between the aircraft and the location of the ground-based obstacles, and at least one display displaying the engine failure awareness chart by the at least one user interface comprising at least one set of lines indicative of a region that is indicative of a minimum distance between the aircraft and the ground-based obstacles.

A second embodiment is directed to a system for determining a minimum distance from ground-based obstacles for an aircraft and displaying an engine failure awareness chart comprising, a user interface configured to display the engine failure awareness chart, at least one processor configured to obtain at least one aircraft characteristic and a location of the ground-based obstacles, and determine a distance between the aircraft and the location of the ground-based obstacles, and at least one display displaying the engine failure awareness chart via the user interface comprising a first set of lines bounding a first region that is a first distance from ground-based obstacles, and a second set of lines bounding a second region that is a second distance from the ground-based obstacles, wherein the first distance is greater than the second distance, wherein the first distance is indicative of a first risk level from the ground-based obstacles and the second distance is indicative of a second risk level from the ground-based obstacles.

A third embodiment is directed to a system for determining a minimum distance from ground-based obstacles for an aircraft and displaying an engine failure awareness chart, comprising a user interface configured to display the engine failure awareness chart, at least one processor configured to obtain at least one aircraft characteristic and a location of the ground-based obstacles, and determine a distance between the aircraft and the location of the ground-based obstacles, and at least one display displaying the engine failure awareness chart via the user interface comprising a first set of lines bounding a first region that is a first distance from the ground-based obstacles, and a second set of lines bounding a second region that is a second distance from the ground-based obstacles, wherein the first distance is greater than the second distance, wherein the first distance is indicative of a first risk level from the ground-based obstacles and the second distance is indicative of a second distance from the ground-based obstacles, and wherein the first set of lines disappear when the ground-based obstacles are greater than the first distance from the aircraft and the second set of lines disappear when the ground-based obstacles are greater than the second distance from the aircraft.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
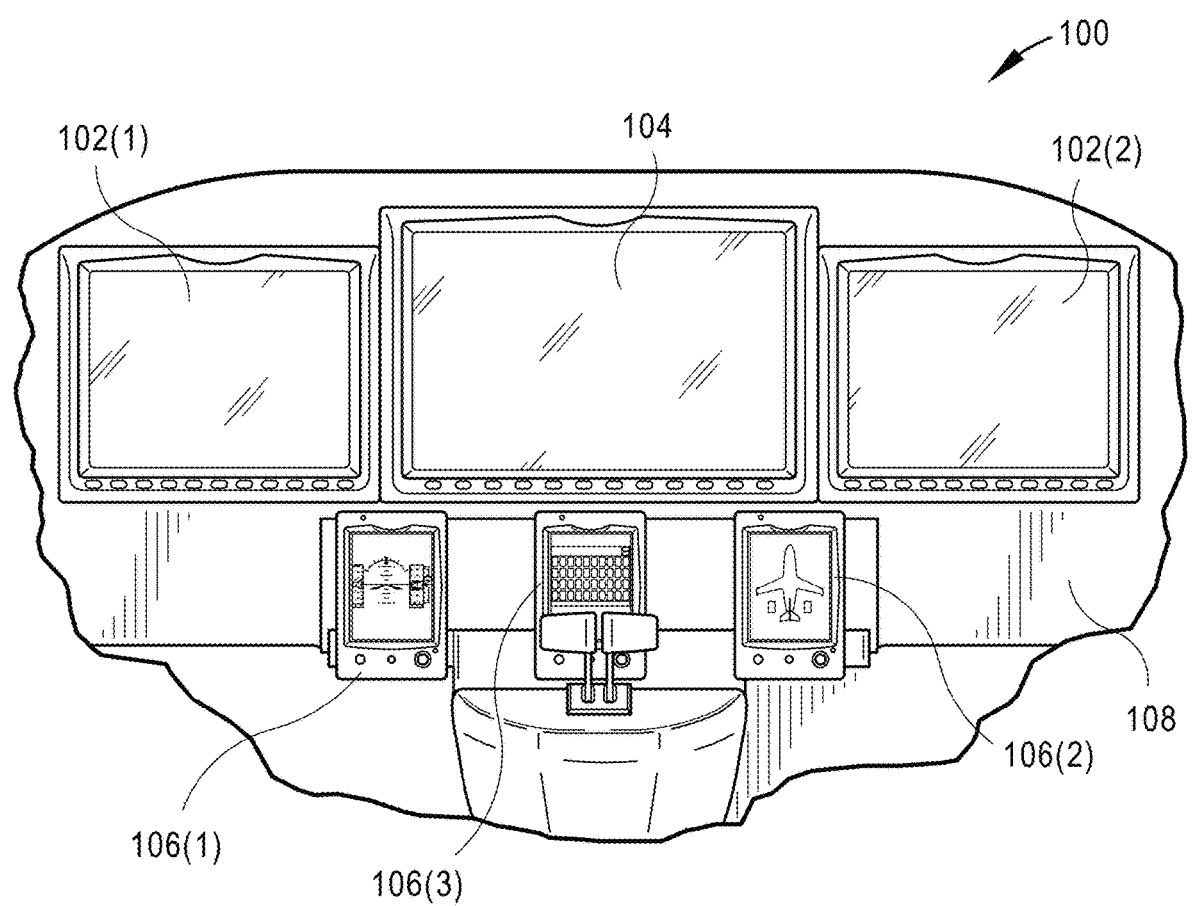
FIG. 1 depicts an exemplary avionics control interface for embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, systems and methods are disclosed for determining an Engine Failure Awareness Chart (EFAC). In some embodiments, the height and location of obstacles that may pose a risk to low flying aircraft are known to aircraft and airport personnel. The locations and heights of the objects may be stored in a database of and accessible to an EFAC system. The EFAC system may track the aircraft location and display an awareness chart displaying distances and possible risk to the aircraft that may be posed by the obstacles. The awareness chart may be updated in real-time to indicate terrain clearances based on current aircraft performance, altitude, location, configuration, etc.

Figure 2:
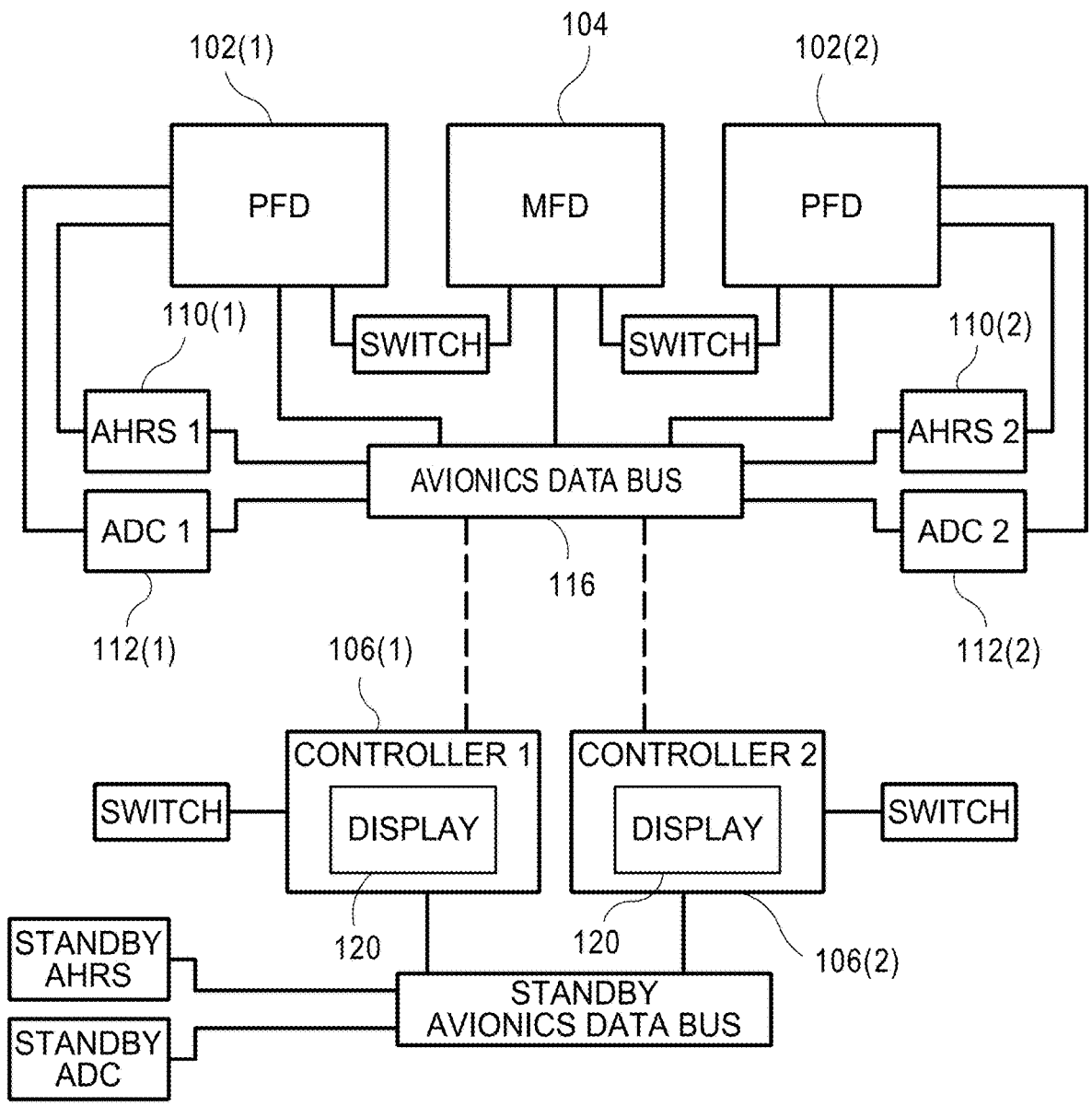
FIG. 2 depicts an exemplary hardware control system for embodiments of the invention.

FIGS. 1-2 illustrate an example configuration of an integrated avionics system. However, in other embodiments, the user interface is provided by a tablet or an electronic flight bag. In some embodiments, an integrated avionics system 100 may include one or more primary flight displays (PFDs) 102, one or more multifunction displays (MFD) 104, and one or more multi-product avionics control and display units (CDU 106). For instance, in the implementation illustrated in FIG. 1, the integrated avionics system 100 may be configured for use in an aircraft that is flown by one or two pilots (e.g., a pilot and a copilot). In this implementation, the integrated avionics system 100 may include a first PFD 102(1), a second PFD 102(2), an MFD 104, a first CDU 106(1), and a second CDU 106(2), and a third CDU 106(3) that are mounted in the aircraft's instrument panel 108. As shown, the MFD 104 is mounted generally in the center of the instrument panel 108 so that it may be accessed by either pilot (e.g., by either the pilot or the copilot). The first PFD 102(1) and the first CDU 106(1) are mounted in the instrument panel 108 generally to the left of the MFD 104 for viewing and access by the pilot. Similarly, the second PFD 102(2) and the second CDU 106(2) are mounted in the instrument panel 108 generally to the right of the MFD 104 for viewing and access by the aircraft's copilot or other crew member or passenger. The third CDU 106(3) may be mounted between the first and second CDUs 106(1), 106(2). In implementations, the CDUs 106 may be positioned within the instrument panel 108 so that they may be readily viewed and/or accessed by the pilot flying the aircraft (which could be either the pilot or copilot).

The PFDs 102 may be configured to display primary flight information, such as aircraft attitude, altitude, heading, vertical speed, and so forth. In implementations, the PFDs 102 may display primary flight information via a graphical representation of basic flight instruments such as an attitude indicator, an airspeed indicator, an altimeter, a heading indicator, a course deviation indicator, and so forth. The PFDs 102 may also display other information providing situational awareness to the pilot such as terrain information, ground proximity warning information, and so forth.

The primary flight information may be generated by one or more flight sensor data sources including, for example, one or more attitude, heading, angular rate, and/or acceleration information sources such as attitude and heading reference systems (AHRS) 110 such as 110(1) and 110(2), one or more air data information sources such as air data computers (ADCs) 112 such as 112(1) and 112(2), and/or one or more angle of attack information sources. For instance, the AHRSs 110 may be configured to provide information such as attitude, rate of turn, slip and skid; while the ADCs 112 may be configured to provide information including airspeed, altitude, vertical speed, and outside air temperature. Other configurations are possible.

Integrated avionics units (IAUs) may aggregate the primary flight information from the AHRS 110 and ADC 112 and, in one example configuration, provide the information to the PFDs 102 via an avionics data bus 116. In other examples, the various IAUs may directly communicate with each other and other system components. The IAUs may also function as a combined communications and navigation radio. For example, the IAUs may include a two-way VHF communications transceiver, a VHF navigation receiver with glide slope, a global positioning system (GPS) receiver, and so forth. As shown, each integrated avionics unit may be paired with a primary flight display, which may function as a controlling unit for the integrated avionic unit. In implementations, the avionics data bus 116 may comprise a high speed data bus (HSDB), such as data bus complying with ARINC 429 data bus standard promulgated by the Airlines Electronic Engineering Committee (AEEC), a MIL-STD-1553 compliant data bus, and so forth. A radar altimeter may be associated with one or more of the IAUs, such as via data bus 116 or a direct connection, to provide precise elevation information (e.g., height above ground) for autoland functionality. For example, in some configurations, the integrated avionics system 100 includes a radar altimeter to assist an autoland module in various functions of the landing sequence, such as timing and maintaining the level-off and/or flare.

The MFD 104 displays information describing operation of the aircraft such as navigation routes, moving maps, engine gauges, weather radar, ground proximity warning system (GPWS) warnings, traffic collision avoidance system (TCAS) warnings, airport information, and so forth, that are received from a variety of aircraft systems via the avionics data bus 116.

The CDUs 106 may furnish a general purpose pilot interface to control the aircraft's avionics. For example, the CDUs 106 allow the pilots to control various systems of the aircraft such as the aircraft's autopilot system, flight director (FD), electronic stability and protection (ESP) system, autothrottle, navigation systems, communication systems, engines, and so on, via the avionics data bus 116. In implementations, the CDUs 106 may also be used for control of the integrated avionics system 100 including operation of the PFD 102 and MFD 104. In some embodiments, the PFD 102 may be a separate wired or wireless computer or mobile device such as a tablet.

The display 120 displays information to the pilot of the aircraft. In implementations, the display 120 may comprise an LCD (Liquid Crystal Diode) display, a TFT (Thin Film Transistor) LCD display, an LEP (Light Emitting Polymer or PLED (Polymer Light Emitting Diode)) display, a cathode ray tube (CRT), and so forth, capable of displaying text and/or graphical information, such as a graphical user interface. The display 120 may be backlit via a backlight such that it may be viewed in the dark or other low-light environments.

The display 120 may include a touch interface, which can detect a touch input within a specified area of the display 120 for entry of information and commands. In implementations, a touch screen may employ a variety of technologies for detecting touch inputs. For example, the touch screen may employ infrared optical imaging technologies, resistive technologies, capacitive technologies, surface acoustic wave technologies, and so forth. In implementations, buttons, softkeys, keypads, knobs and so forth, may be used for entry of data and commands instead of or in addition to the touch screen.

Figure 3:
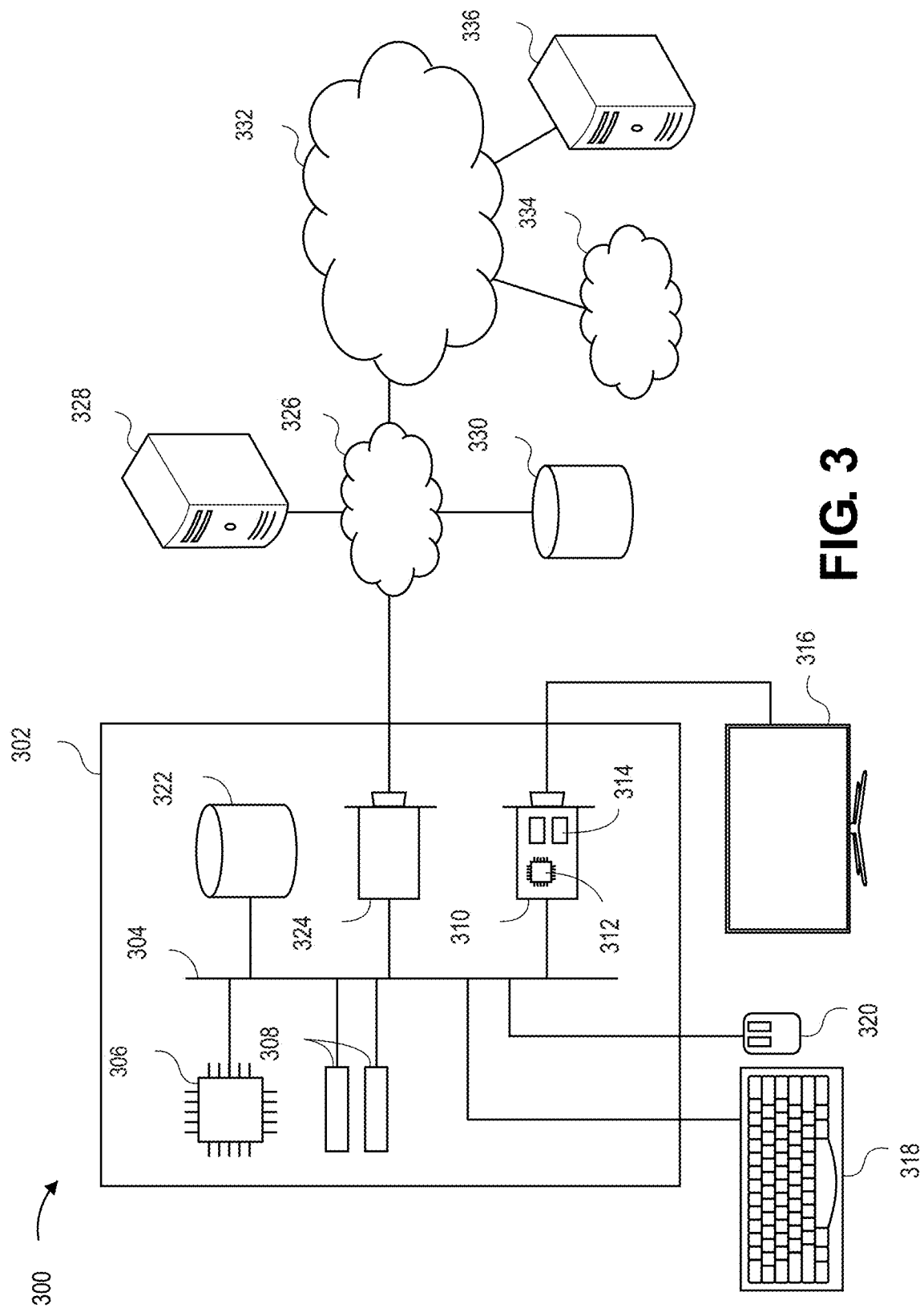
FIG. 3 depicts an exemplary hardware system for embodiments of the invention.

Turning now to FIG. 3, an exemplary hardware platform 300 that can form one element of certain embodiments of the invention is depicted. Computer 302 can be a desktop computer, a laptop computer, a server computer, a mobile device such as a smartphone or tablet, or any other form factor of general- or special-purpose computing device. Depicted with computer 302 are several components, for illustrative purposes. In some embodiments, certain components may be arranged differently or absent. Additional components may also be present. In some embodiments, computer 302 may be wired or wirelessly connected to the integrated avionics system 100. Included in computer 302 is system bus 304, whereby other components of computer 302 can communicate with each other. In certain embodiments, there may be multiple busses or components may communicate with each other directly. Connected to system bus 304 is central processing unit (CPU) 306. Also attached to system bus 304 are one or more random-access memory (RAM) modules 308. Also attached to system bus 304 is graphics card 310. In some embodiments, graphics card 310 may not be a physically separate card, but rather may be integrated into the motherboard or the CPU 306. In some embodiments, graphics card 310 has a separate graphics-processing unit (GPU) 312, which can be used for graphics processing or for general purpose computing (GPGPU). Also, on graphics card 310 is GPU memory 314. Connected (directly or indirectly) to graphics card 310 is display 316 for user interaction. In some embodiments no display is present, while in others it is integrated into computer 302. Similarly, peripherals such as keyboard 318 and mouse 320 are connected to system bus 304. Like display 316, these peripherals may be integrated into computer 302 or absent. Also connected to system bus 304 is local storage 322, which may be any form of computer-readable media, and may be internally installed in computer 302 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 324 is also attached to system bus 304 and allows computer 302 to communicate over a network such as network 326. NIC 324 can be any form of network interface known in the art, such as Ethernet, ATM, fiber, Bluetooth, or Wi-Fi (i.e., the IEEE 802.11 family of standards). NIC 324 connects computer 302 to local network 326, which may also include one or more other computers, such as computer 328, and network storage, such as data store 330. Generally, a data store such as data store 330 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 328, accessible on a local network such as local network 326, or remotely accessible over Internet 332. Local network 326 is in turn connected to Internet 132, which connects many networks such as local network 326, remote network 334 or directly attached computers such as computer 336. In some embodiments, computer 302 can itself be directly connected to Internet 332.

In scenarios where an aircraft engine fails after takeoff, the pilot must attempt to fly the aircraft to a landing area. There may be obstacles that the pilot must avoid. The EFAC may provide awareness of the obstacles and where the pilot may navigate the aircraft to avoid the obstacles. Warning zones indicative of various risk levels may be displayed allowing the pilot to make quick decisions and navigate the aircraft to maintain minimum distances from the obstacles.

Figure 4:
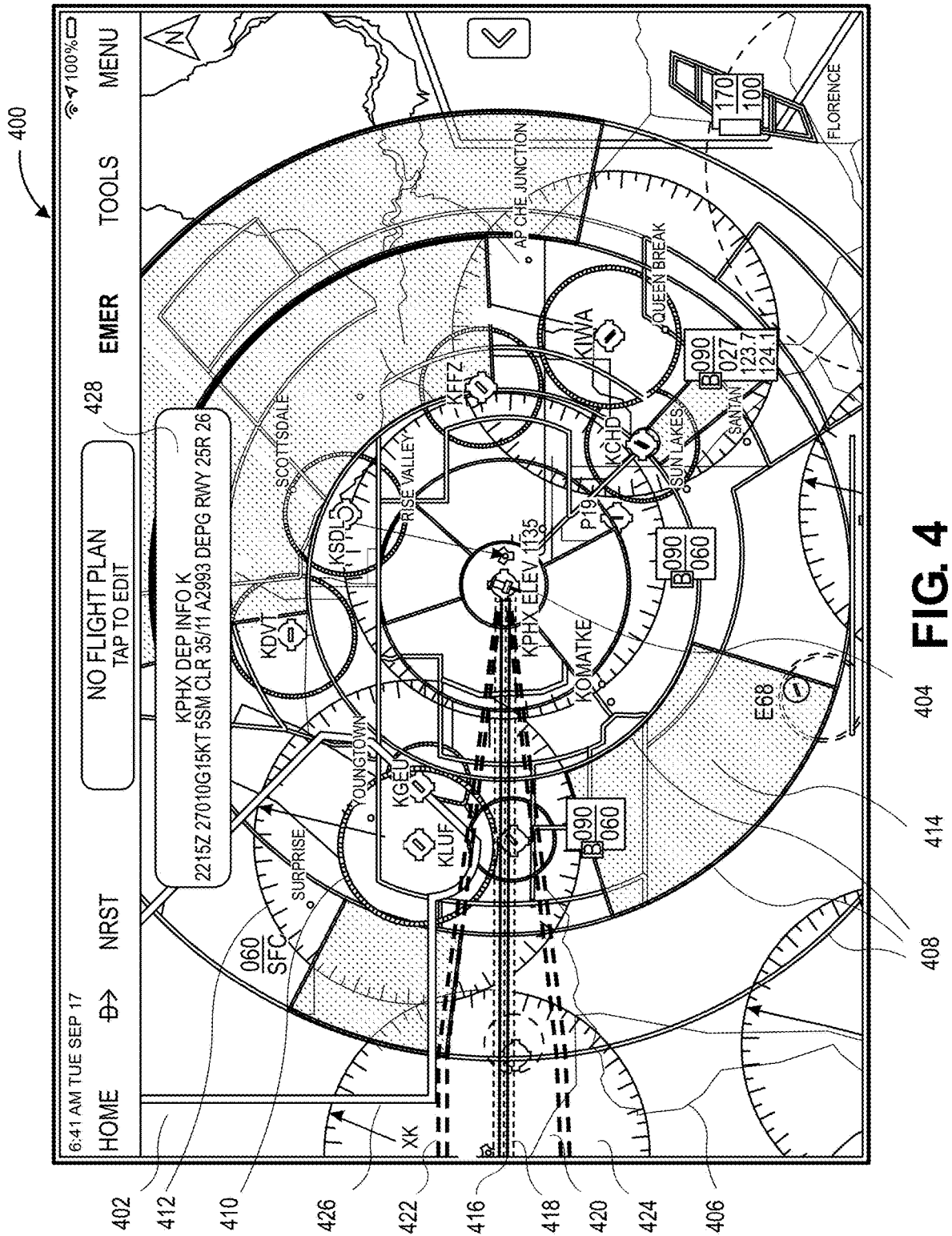
FIG. 4 depicts an embodiment of a user interface displaying an Engine Failure Awareness Chart.

FIG. 4 depicts an embodiment of a user interface 400 presenting the Engine Failure Awareness Chart (EFAC) 402. In some embodiments, the EFAC 402 is displayed via the computer 302 or the integrated avionics system 100 described above. The EFAC 402 may be interactive such that the user may zoom, pan, click, and manipulate images on the display. In some embodiments, the EFAC 402 is displayed on a touchscreen device and the interaction is performed via the touchscreen.

In some embodiments, The EFAC 402 may present a region around an airport 404. The airport 404 may be the departure airport of the aircraft. Radar at the airport 404 may track the aircraft as the aircraft departs and may measure location and altitude and determine speed and direction. Further, the aircraft may track location, altitude, speed, engine performance, and any other aircraft performance and configuration data that may be useful in determining the aircraft performance and possible rates of climb and speeds. The EFAC 402 may display the altitude of the aircraft and the relative distance between the aircraft and the airport 404 as well as a distance between the aircraft and an obstacle 406. The obstacle 406 may be an exemplary mountain range as depicted. Further, the obstacle 406 may be buildings, houses, towers, and any other man-made or natural object or structure. The distances may be displayed as straight-line distances, location and angle measurements, or may be broke down into dimensional components such as x, y, and z components of the Cartesian coordinate system. In some embodiments, the airport environmental may be received from the airport 404 and may be accessible from an application such as Digital Airport Terminal Information Service (D-ATIS) displayed in the block 428. The information obtained from the exemplary third-party application may be the airport environmental conditions described in detail below.

In some embodiments, airport circular regions 408 may be displayed around the airport 404. The airport circular regions 408 may be displayed and represent any distance from the airport 404. Providing the distance from the airport 404 gives the pilot a distance that the aircraft has travelled from takeoff and consequently, an expected aircraft altitude. In engine-out scenarios, the altitude may be lower and the pilot may be notified of the difference between actual altitude and expected altitude on the EFAC 402. Further, the actual altitude may be used to determine the distance between the aircraft and the obstacle 406.

In some embodiments, the obstacle 406 may be displayed with an obstacle region around the obstacle 406. The obstacle 406 may be ground-based structures such as either man-made structures (e.g., buildings, towers, bridges, etc.) or natural structures (e.g., mountains, hills, etc.). In some embodiments, the location, size, and height of the obstacle 406 may be stored in a data base, such as a terrain warning and awareness system (TAWS) database, and accessed by the EFAC 402 or the obstacle 406 may be detected by radar and labels from stored information associated with the location of the obstacle is detected. The obstacle 406 may be an exemplary mountain range and may be labeled as such on the display.

In some embodiments, the obstacle 406 may be displayed with the obstacle region. The obstacle 406 may be displayed with the obstacle region depicting a first level of risk of the obstacle 406. The first level of risk may be indicative of, in some embodiments, a no-fly zone. The no-fly zone may be a region that is off limits to fly because the aircraft is too close to the obstacle 406. The no-fly zone may be determined by FAA regulations. In some embodiments, a second obstacle region may be displayed surrounding the obstacle 406. The second obstacle region may be indicative of a second level of risk of the obstacle 406. The second level of risk may be a lower level of risk. Any number of circular regions may be displayed and indicative of any number of risk levels.

In some embodiments, the circular regions may be spheres projecting not only in a lateral plane but also vertically above the obstacle 406. Consequently, as the aircraft flies higher the obstacle region may disappear from the display as the aircraft reaches a vertical or straight-line distance greater than a minimum distance from the obstacle 406.

In some embodiments, the obstacle 406, or the obstacle regions may be color-coded. For example, the color of the obstacle 406 may be indicative of a type of the obstacle 406 or a height of the obstacle 406. For example, the obstacle 406 may be blue and may be indicative of man-made objects or the obstacle 406 may be red and may be indicative of natural objects. In some embodiments, a yellow circular region may be depicted around mountains and may be indicative of a size of the mountain as the yellow lines may represent a minimum distance (or risk level) from the surface of the mountain.

For example, the obstacle region may be the exemplary shaded region 414. The shaded regions 414 may depict high-threat areas. These high-threat areas may be indicative of other aircraft or man-made and natural obstacles as described above. In some embodiments, the shaded regions 414 may be various colors that are indicative of the level of risk. For example, no color may indicate no threat, yellow may indicative a moderate threat, and red may indicated a no-fly area that has been deemed off limits. Any various colors may be used to indicate risk levels. As described below in more detail, shaded regions 414 may be utilized as part of EFAC 402 to enable the quick identification of areas with suitable terrain clearance based on projected climb performance. These regions 414 may be dynamically generated and identified based on current aircraft performance, location, altitude, configuration, and the like.

In some embodiments, the aircraft may take off from a particular runway from the airport 404 heading west as depicted in the EFAC 402. An aircraft flight path (departure track) 416 may be displayed. The aircraft flight path (departure track) 416 can be depicted with one or more solid lines. To reduce clutter, only one departure track may be illustrated.

In some configurations, flight path 416 represents the intended center of an engine failure track procedure that is enabled upon the identification of an engine out event. For instance, EFAC 402 may be utilized by pilots in engine out scenarios, such as by accessing EFAC 402 using an EFB, tablet, integrated avionics, etc., as described above. Additionally or alternatively, EFAC 402 and associated path 416 may be automatically generated and displayed upon detection of an engine out situation by the integrated avionics system 100.

Two short dashed lines 418 may be displayed to the outside of the flight path 416 representing the bounds of the regulatory obstacle accountability area (OAA) which is used to calculate the maximum allowable takeoff weight and indicates the area for which the aircraft will clear obstacles by regulatory requirements, assuming an engine failure at V1. Long dashed lines 422 indicate the bounds of warning area 420, which represents the area in which obstacles will be cleared at the aircraft's gross height (actual, not degraded for regulatory compliance) with an engine failure at V1. Lines 418 therefore represent an area where obstacles are cleared by net height, which is a degraded climb gradient forming a safety margin. However, any risk level or regulatory compliance may be indicated by lines 418, 420 and warning area 420. The short dashed lines 418 and long dashed lines 422 are exemplary only and may be displayed as solid lines with color variations for differentiation as described below.

In some embodiments, the short dashed lines 418 and the long dashed lines 422 may be displayed as various colors to represent various risk levels. For example, the short dashed lines 418 may be displayed as yellow indicating that the aircraft may be entering the first risk level and the long dashed lines 422 may be red indicating that the aircraft may be entering the second risk level. The lines may be any color representing any risk level.

Areas outside warning area 420 are depicted on EFAC 402 to show where the aircraft must be navigated to ensure terrain clearance. These areas, which are displayed as sectors in some embodiments, are depicted based on the projected climb performance of the aircraft. Thus, for example, shaded region 414 represents a sector where terrain clearance is not assured based on the projected climb performance of the aircraft with an engine out. Other sectors on EFAC 402 that are not shaded, and outside of warning area 420, indicate areas where suitable terrain clearance is provided based on projected climb performance. Thus, in an engine out scenario, EFAC 402 may be dynamically updated to show lines 418 (the regulatory obstacle accountability area), warning area 420, and EFAC sectors with undesirable or unsuitable terrain clearance such as region 414. Such functionality enables the pilot to graphically identify a suitable course for the aircraft without needing to read lengthy textual procedures. In the example of FIG. 4, for instance, the pilot could easily identify that areas northeast of the departure airport should be avoided.

In some embodiments, as described above, the short dashed lines 418 may be indicative of first risk level of obstacles around the airport. The first zone 420 may represent regulatory minimum distance such as, for example, FAA engine out regulations. The pilot may navigate the aircraft on the flight path 416 to maintain the designated flight path provided for the flight and maintain FAA regulations. The EFAC may provide the pilot with the flight lines to provide the pilot with an awareness of the potential risk of leaving the designated flight path 416. For example, if the pilot navigates the aircraft outside of the short dashed lines 418, the aircraft may be outside of the regulations as long as the aircraft stays within the long dashed lines 422.

Beyond the long dashed lines 422 may be obstacles that are at the same altitude or higher that the aircraft may conflict with if the aircraft flies outside of the long dashed lines 422. As the aircraft gains altitude the long dashed lines 422 may conform to buildings and ground terrain to display alternative routes that the aircraft may navigate that are above the buildings and ground terrain. For example, the pilot may navigate the aircraft to KLUF airport. Similarly to the airport 404, KLUF is displayed with interior ring 410 and exterior ring 412 such that the pilot may know the distance to the alternative landing area.

In some embodiments, the EFAC 402 may update continuously as the aircraft flies. Updating continuously provides the pilot with real-time awareness of the environment around the aircraft and the airport 404. The distance from the aircraft to the obstacle 406 and the flight path 416 and the obstacle risk level areas may be updated based on at least one of the aircraft location, speed, and altitude. The aircraft may increase altitude and consequently, move to an altitude that is above the obstacle 406. As the aircraft gains altitude, some obstacles may recede from risk levels and any indicia indicative of the threat of the obstacle 406 may be rescaled or not displayed when the threat is reduced or recedes past minimum distances.

In some embodiment, an obstacle zone 426 may surround the obstacle 406 and any other known obstacles on the ground. The obstacle zone 426 may be indicative of elevated obstacles such as, for example, man-made buildings, towers, houses, and bridges, and natural structures such as, for example, mountains, and hills. The obstacle zone 426 may be any color representing the risk level as described above and may disappear when the aircraft gains altitude above a minimum distance from the obstacles.

In an exemplary embodiment depicted in FIG. 4, an aircraft is departing from the airport 404 heading west. The pilot in the aircraft communicates with the airport personnel that the aircraft is clear for takeoff on the determined flight path 416. After lift-off, an engine stops working. The EFAC 402 may be displayed to the pilot either before the engine is out or manually activated or automatically activated when the engine is out. In some embodiments, the pilot or co-pilot may manually access the EFAC 402 via the user input at any time. In such configurations, path 416 may represent the intended center of the engine failure track procedure that should be followed by the pilot.

When the aircraft is close to the ground, all sectors of EFAC 402 may indicate terrain risk—e.g., be colored red. As the aircraft increases altitude, some red sectors may change to white (or other suitable colors), indicating areas where suitable terrain clearance may be found. The EFAC 402 is continually changing the as the distance between the aircraft and the obstacles increases. The EFAC 402 provides the pilot with an awareness of threats around the aircraft. As the aircraft gains altitude, path 416 may update to provide the pilot with alternative flight paths to get the aircraft to a landing area or turn back to the airport 404 depending on the condition of the aircraft.

In some embodiments, the EFAC 402 center is at the airport 404 and the information obtained at the aircraft is sent from airport servers. Alternatively, in some embodiments, the EFAC 402 center is the aircraft and the EFAC 402 updates with the aircraft as the center. The information for determining the EFAC 402 display may be calculated by processors at the aircraft or at the airport 404 as described above. The EFAC 402 may update with all information calculated and displayed from the aircraft. Consequently, the EFAC 402 follows the aircraft and displays the flight path 416, short dashed lines 418, and long dashed lines 422, as well as the obstacle 406 and any other zone lines and threat-level zones from the point-of-view of the aircraft rather than from the airport 404. This allows the pilot to see potential flight paths projected from the view of the aircraft.

Figure 5:
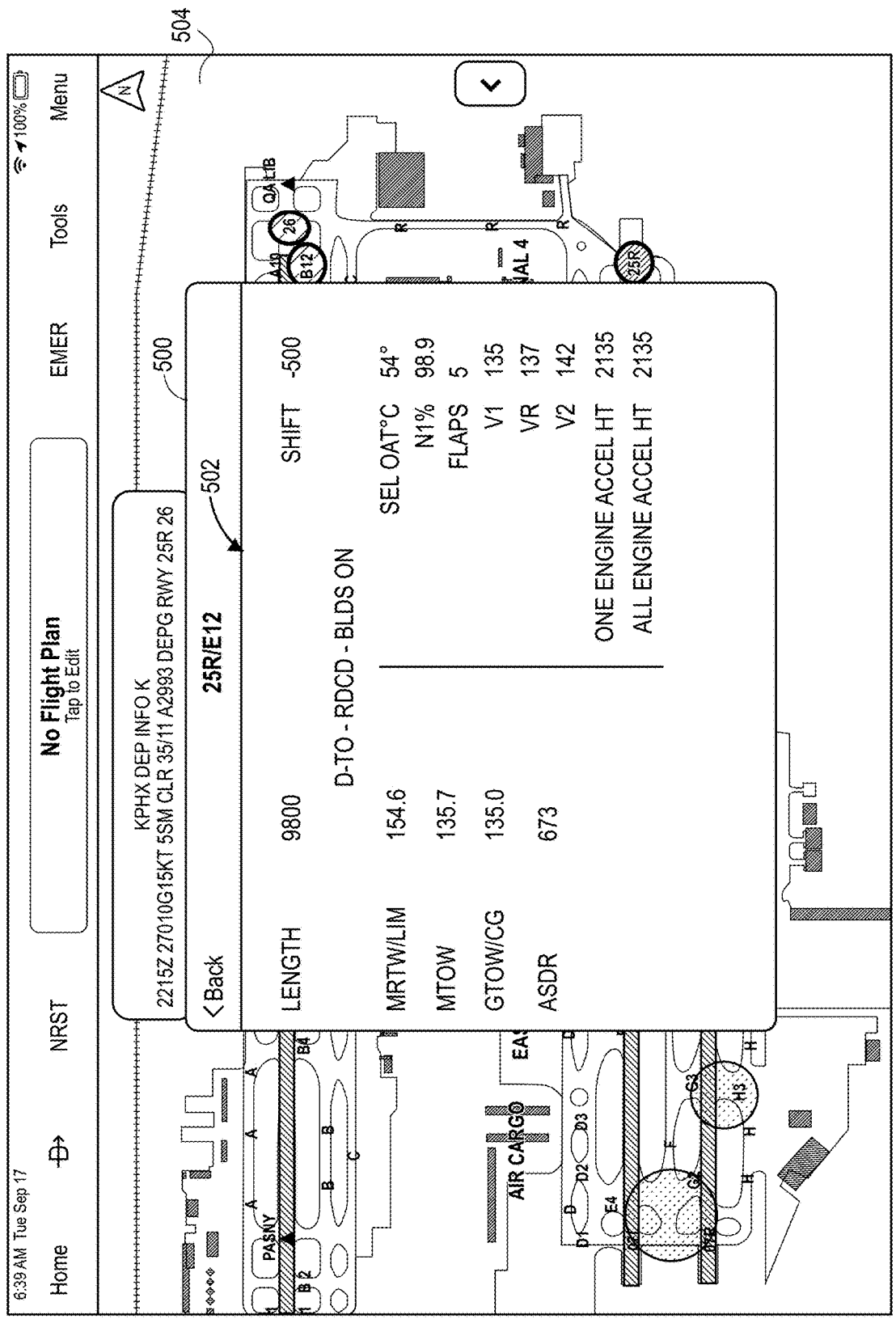
FIG. 5 depicts an embodiment of a performance screen displaying takeoff performance details.

FIG. 5 depicts a performance screen 500 displaying takeoff performance details 502. The performance screen 500 may be accessed via the user interface 504 or the user interface 400. The user (e.g., pilot or co-pilot), may access the performance screen 500 by interacting with the user interface by clicking or hovering a curser over an icon, clicking, or simply touching a touchscreen. In some embodiments, the performance screen 500 is automatically displayed when a triggering event (e.g., engine out, takeoff, etc.) occurs. The performance screen 500 may be displayed in any region of the display as a splash screen as shown in FIG. 5.

The performance screen 500 may list performance details 502 comprising airport characteristics, and aircraft characteristics. For example, the performance screen 500 may list runway lengths, aircraft takeoff weights, aircraft stop distances, runway conditions, aircraft configuration, atmospheric conditions, aircraft speed requirements, and acceleration heights for all engines and engine-out conditions as displayed in FIG. 5.

Figure 6:
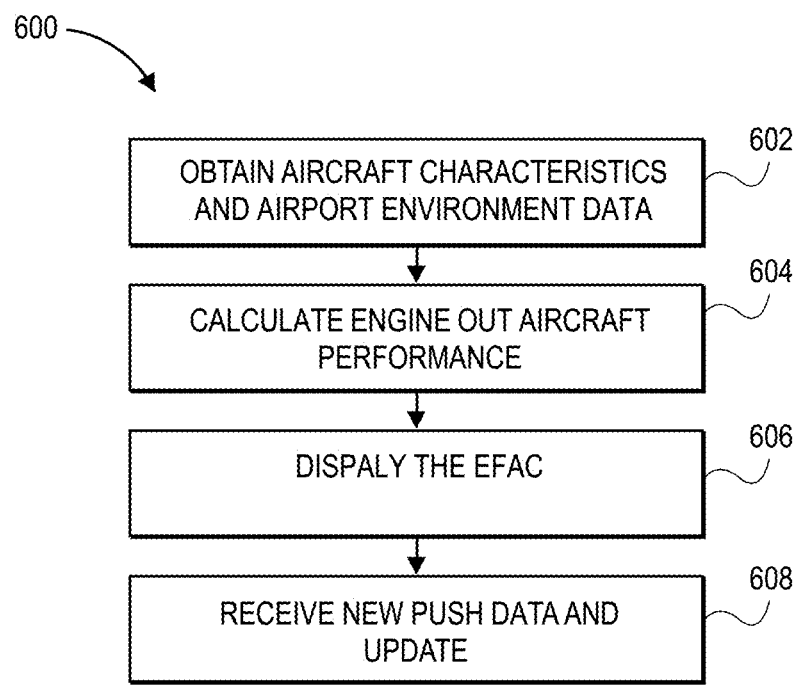
FIG. 6 depicts an exemplary process of determining and displaying the Engine Failure Awareness Chart of FIG. 4.

FIG. 6 depicts an exemplary process of generating the Engine Failure Awareness Chart (EFAC) 402. At step 602, the EFAC 402 receives aircraft characteristics and information indicative of the airport environment. The aircraft characteristics may be, for example, the type of aircraft and associated geometry and dynamic model, weight and balance information, takeoff configuration, and any other aircraft information that may be useful for determining the full engine takeoff performance and the engine-out takeoff performance. The environmental conditions may be any information indicative of the takeoff environment such as, for example, weather conditions, runway conditions, atmospheric pressure, air temperature, elevation of the airport, magnetic variation, and any other information that may be useful in designating engine out takeoff conditions. Further, the airport environment may be any airport layout information including runway maps and runway designations and any surrounding obstacle information described above.

At step 604, the aircraft characteristics and the airport environment may be combined to generate the displayed information on the user EFAC 402. The aircraft flight path 416 may be determined from the aircraft information and the takeoff runway. The information may be combined to determine obstacles in the area and heights of the obstacles that may be a threat to the aircraft with an engine out.

At step 606, the EFAC 402 is displayed. The EFAC 402 may display the obstacles and the relative distances from the aircraft to the obstacles. Further, the EFAC 402 may display the aircraft flight path 416 and various threat-level zones as described in embodiments above.

At step 608, the EFAC 402 may be updated in real time. As the aircraft climbs the distances and the zones may be updated as described in embodiments above. As the aircraft climbs the red zones may disappear or change to white as the distance between the aircraft and the obstacles increase. In some embodiments, the airport is displayed as the center of the EFAC 402 and in some embodiments, the aircraft is displayed as the center of the EFAC 402.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for determining a minimum distance from ground-based obstacles for an aircraft and displaying an engine failure awareness chart, comprising:
   a user interface configured to display the engine failure awareness chart;
   at least one processor configured to:
      obtain an aircraft characteristic and a location of the ground-based obstacles; and
      determine a distance between the aircraft and the location of the ground-based obstacles; and
   at least one display displaying the engine failure awareness chart by the at least one user interface comprising at least one set of lines indicative of a region that is indicative of a minimum distance between the aircraft and the ground-based obstacles.

2. The system of claim 1,
   wherein the a at least one set of lines comprises:
   a first set of lines bounding a first region that is indicative of a first distance from the ground-based obstacles; and
   a second set of lines representing a second region that is a second distance from the ground-based obstacles,
   wherein the first distance is greater than the second distance, and
   wherein the first distance is indicative of a first risk level from the ground-based obstacles and the second distance is indicative of a second risk level from the ground-based obstacles.

3. The system of claim 1, wherein the user interface is updated continuously such that the at least one line disappears when the ground-based obstacles are a minimum distance from the aircraft.

4. The system of claim 1, wherein the minimum distance is based on regulatory flying distances for engine-out aircraft.

5. The system of claim 1, wherein the at least one line originates from a departure airport of the aircraft and represents a region of travel of the aircraft that is a minimum distance from the ground-based obstacles.

6. The system of claim 1, wherein the at least one line originates at the location of the aircraft and is updated continuously along with the location of the aircraft.

7. The system of claim 1, the user interface is further configured to display a region indicative of a distance from the ground-based obstacles, wherein the ground-based obstacles are at least one of man-made and natural structures.

8. The system of claim 1, the user interface further configured to display circular regions around a departure airport of the aircraft,
   wherein the departure airport is located at a center of the circular region, and
   wherein the circular region is indicative of a distance from the airport.

9. A system for determining a minimum distance from ground-based obstacles for an aircraft and displaying an engine failure awareness chart, comprising:
   a user interface configured to display the engine failure awareness chart;
   at least one processor configured to:
      obtain at least one aircraft characteristic and a location of the ground-based obstacles; and
      determine a distance between the aircraft and the location of the ground-based obstacles; and
   at least one display displaying the engine failure awareness chart via the user interface comprising:
      a first set of lines bounding a first region that is a first distance from ground-based obstacles; and
      a second set of lines bounding a second region that is a second distance from the ground-based obstacles,
      wherein the first distance is greater than the second distance,
      wherein the first distance is indicative of a first risk level from the ground-based obstacles and the second distance is indicative of a second risk level from the ground-based obstacles.

10. The system of claim 9,
    wherein the engine failure awareness chart is updated continuously,
    wherein the first set of lines disappear when the ground-based obstacles are greater than the first distance from the aircraft and the second set of lines disappear when the ground-based obstacles are greater than the second distance from the aircraft.

11. The system of claim 9, wherein at least the first risk level is based on regulatory flying distances for engine-out aircraft.

12. The system of claim 9, wherein the first set of lines and the second set of lines originate from a departure airport of the aircraft.

13. The system of claim 9, wherein the first set of lines and the second set of lines originate at the location of the aircraft and are continuously updated along with the location of the aircraft.

14. The system of claim 9, wherein the ground-based obstacles are man-made objects.

15. The system of claim 9, the user interface further configured to display circular regions around a departure airport of the aircraft,
    wherein the departure airport is located at a center of the circular region, and
    wherein the circular region is indicative of a distance from the airport.

16. A system for determining a minimum distance from ground-based obstacles for an aircraft and displaying an engine failure awareness chart, comprising:
    a user interface configured to display the engine failure awareness chart;
    at least one processor configured to:
       obtain at least one aircraft characteristic and a location of the ground-based obstacles; and
       determine a distance between the aircraft and the location of the ground-based obstacles; and
    at least one display displaying the engine failure awareness chart via the user interface comprising:
       a first set of lines bounding a first region that is a first distance from the ground-based obstacles; and a second set of lines bounding a second region that is a second distance from the ground-based obstacles, wherein the first distance is greater than the second distance, wherein the first distance is indicative of a first risk level from the ground-based obstacles and the second distance is indicative of a second distance from the ground-based obstacles, and wherein the first set of lines disappear when the ground-based obstacles are greater than the first distance from the aircraft and the second set of lines disappear when the ground-based obstacles are greater than the second distance from the aircraft.

17. The system of claim 16, wherein the first set of lines and the second set of lines are based on flying distances for engine-out aircraft.

18. The system of claim 16, wherein the first set of lines and the second set of lines originate from a departure airport of the aircraft.

19. The system of claim 16, wherein the first set of lines and the second set of lines originate at the location of the aircraft and are continuously updated along with the location of the aircraft.

20. The system of claim 16, the user interface further configured to display circular regions around a departure airport of the aircraft, wherein the airport is located at a center of the circular region, and wherein the circular region is indicative of a distance from the airport.

* * * * *